May 27, 1969 J. B. D'ADAMO 3,446,546

CABINET FOR A TELEVISION RECEIVER

Filed Dec. 2, 1964 Sheet 1 of 2

INVENTOR:
JOSEPH B. D'ADAMO,
BY William S. Wolfe
HIS ATTORNEY.

CABINET FOR A TELEVISION RECEIVER

Filed Dec. 2, 1964

INVENTOR:
JOSEPH B. D'ADAMO,
BY William S. Wolfe
HIS ATTORNEY.

United States Patent Office 3,446,546

Patented May 27, 1969

3,446,546

CABINET FOR A TELEVISION RECEIVER

Joseph B. D'Adamo, Fayetteville, N.Y., assignor to General Electric Company, a corporation of New York Filed Dec. 2, 1964, Ser. No. 415,299
Int. Cl. H05k 5/00; A47b 47/00, 57/00
U.S. Cl. 312—323 4 Claims

ABSTRACT OF THE DISCLOSURE

A television receiver cabinet is provided including a completely retractable one-piece front panel having furniture representing indicia formed on the outer surface thereof. The true function of the receiver is completely disguised by the simulation of any desired furniture design. Through the use of suitable track means the panel is stowed in a position underlying the top of the cabinet, the panel extending through a suitable aperture in the rear of the cabinet.

Figure 1:
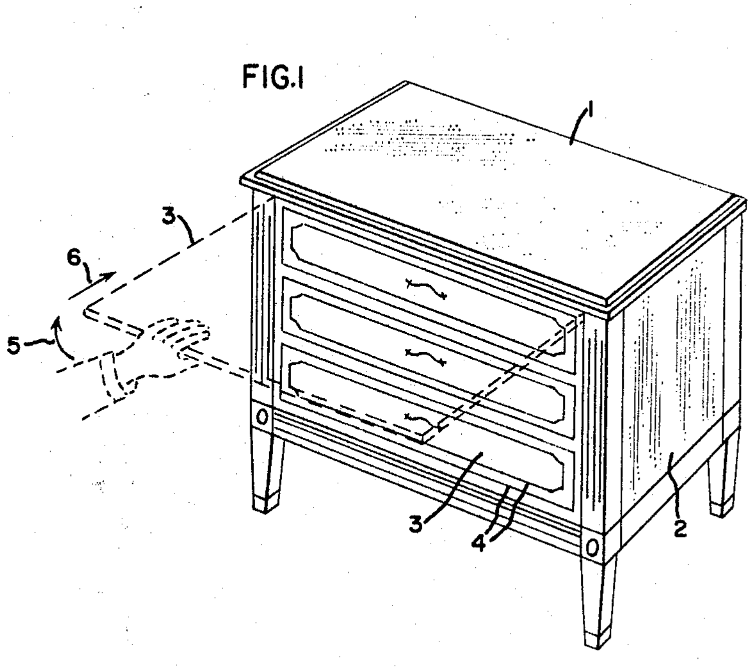

The present invention relates to a cabinet for a television receiver and, more specifically to such a cabinet including a device for completely disguising the function of the receiver during non-use.

It is desirable in television receivers, particularly in the more expensive models, to disguise the function of the receiver during non-use when a television presentation is not being viewed. This is readily apparent when one considers the non-aesthetic appearance of the display screen of a television receiver in the absence of a presentation. Further, the disguise effected should be such that the receiver during non-use, presents a pleasing appearance in keeping with the general decor of the room where located.

In the past numerous attempts have been made at providing a more pleasing appearance for television receivers during non-use. Generally, such attempts have employed various complex door arrangements to cover the display screen and the associated controls of the television receiver during non-use. Thus, folding doors, multiple hinged doors, multiple panel sliding doors and doors stowed through the use of various complex stowage mechanisms have been employed in the prior art.

None of the prior art approaches were found to be completely satisfactory since they exhibited in general several inherent disadvantages.

In general, the prior art approaches did not completely disguise the function of the television receiver during non-use. Thus, in such approaches even though the display screen might be hidden during non-use to provide a somewhat more pleasing appearance it was still readily apparent that the object in question was a television receiver.

Prior art arrangements also severely limited the freedom of design of the cabinetry of the television receiver since the design of the doors had to follow the functional requirements thereof. This limitation severely restricted the realizing of a wide range of aesthetically pleasing cabinetry designs compatible with the differing requirements of traditional, provincial, colonial, modern, etc. decors.

Also, the prior art approaches were generally unduly expensive because of the use of relatively expensive multiple panel arrangements and/or multiple hinges or complex stowage mechanisms. A further expense was encountered in the prior art due to the requirement that the doors employed be finished on both sides because the back as well as the front surface of the door was freely visible.

Further, the prior art arrangements in general did not provide for stowage of the doors completely out of sight when a television presentation was being viewed. This, accordingly, resulted in a generally unpleasing appearance of the receiver during viewing.

Yet, further, the prior art arrangements required relatively complex manipulations to move the doors from the non-stowed to the stowed position or vice versa.

Still further, due to the aforementioned complexity, the prior art arrangements were subject to malfunction and breakage during repeated use.

The present invention provides a simplified device for completely disguising the function of a television receiver during non-use while still overcoming the prior art problems.

Accordingly, an object of the invention is to provide an improved device for completely disguising the function of a television receiver during non-use which is less complex and less expensive than prior art devices.

Another object is to provide a device for completely disguising the function of a television receiver during non-use which permits full freedom of design of the receiver cabinetry.

Still another object is to provide a device for completely disguising a television receiver during non-use wherein the device utilized to cover the display screen is stowed completely out of sight when a television presentation is being viewed.

Yet another object is to provide a device for completely disguising the function of a television receiver wherein the device is easily manipulated from the non-stowed to the stowed position and vice versa.

These and other objects are achieved in one embodiment of the invention through the use of a completely retractable one-piece front panel which is stowed in a position generally parallel to and underlying the top of the receiver cabinet. The retractable one-piece front panel is provided with furniture representing indicia on the outer surface thereof to allow simulation of any desired furniture design. The retractable front panel is stowed by simple rotation of the panel from a position generally perpendicular to the top structure to a position generally parallel therewith. The retractable panel is then slid into a position underlying the top of the cabinet through the use of suitable tracks which cooperate with the edges of the panel. Since in most television receivers the area to be disguised is higher than the depth of the cabinet, in one embodiment of applicant's invention an aperture is provided in the rear of the cabinet through which the retractable panel extends in the stowed position. In this manner the panel is stowed completely out of sight, the retractable panel extending behind the rear of the cabinet no further than the projection which is usually provided on the rear of the cabinet to receive the extremity of the cathode ray tube.

Figure 2:
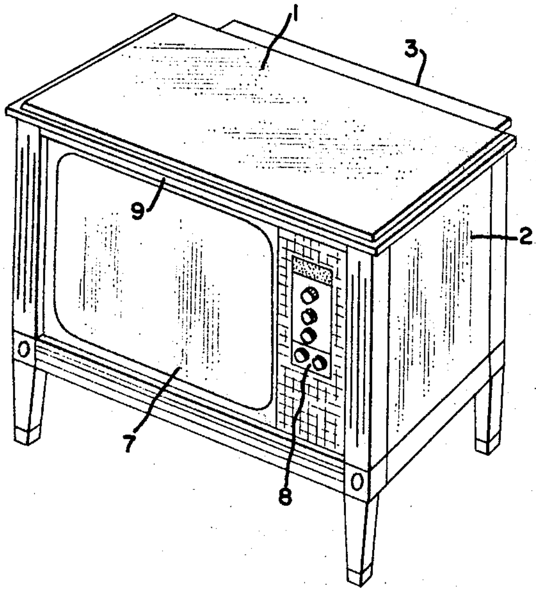
Figure 3:
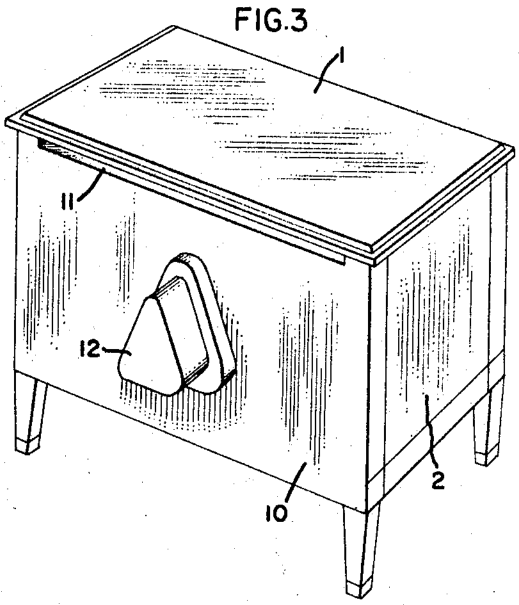
Figures 4, 5, 6, 7, 8:
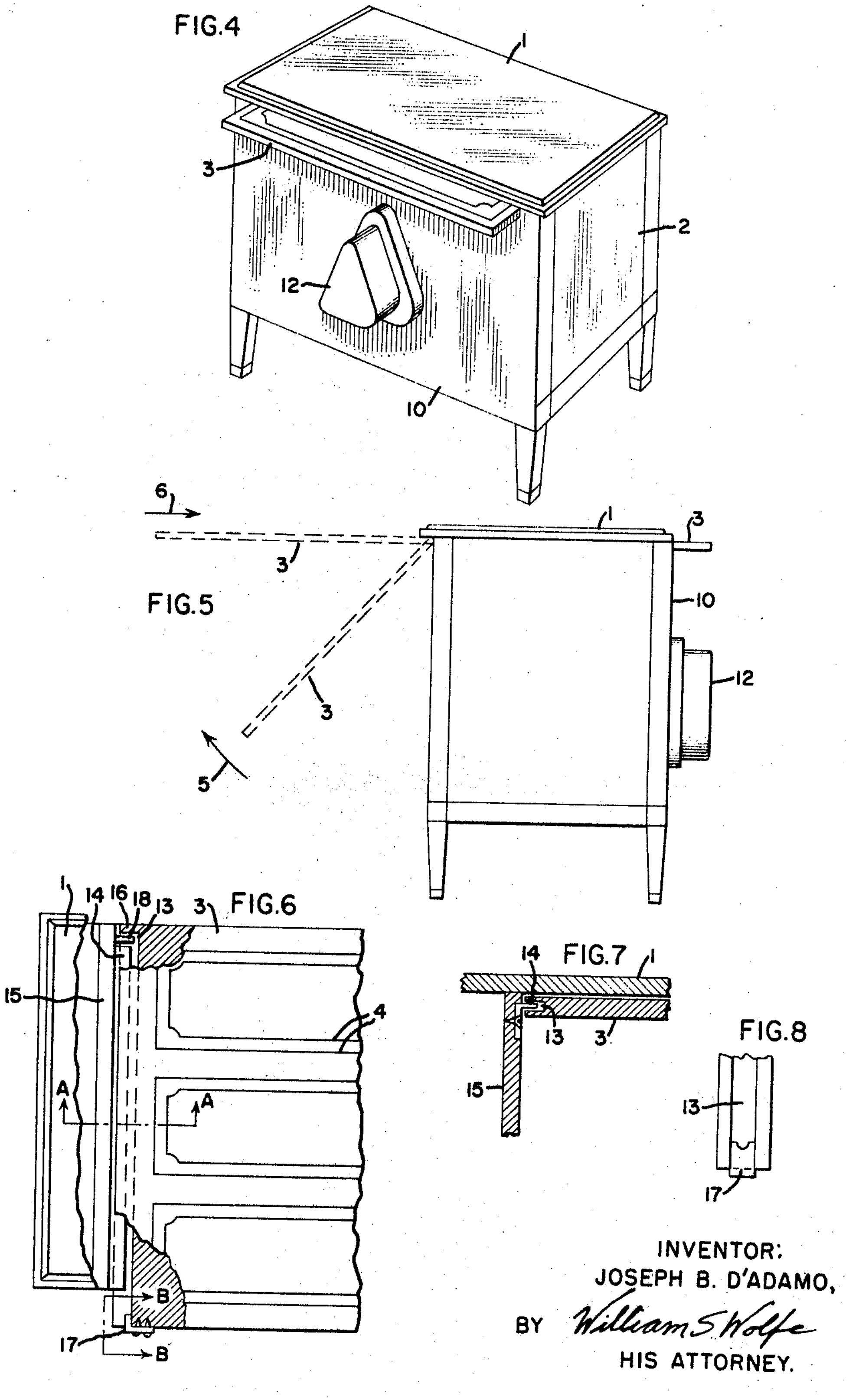

The novel and distinctive features of the invention are set forth in the appended claims. The invention itself, together with further objects and advantages thereof, may best be understood by reference to the following description and accompanying drawings in which:

FIGURE 1 is a front perspective view of one embodiment of a television receiver cabinet utilizing the retractable one-piece front panel of the present invention, FIGURE 2 is a front perspective view of the television receiver cabinet of FIGURE 1 wherein the retractable one-piece front panel is in the stowed position, FIGURE 3 is a rear perspective view of the television receiver cabinet shown in FIGURE 1 wherein the retractable front panel is in the non-stowed position, FIGURE 4 is a rear perspective view similar to FIGURE 3 wherein the retractable front panel is in the stowed position, FIGURE 5 is a side view of the television receiver cabinet of FIGURE 1 indicating the manner in which the retractable front panel is moved from the non-stowed to the stowed position, FIGURE 6 is a top view partially broken away of the television receiver cabinet shown in FIGURE 1, FIGURE 7 is a sectional view taken along the line A—A in FIGURE 6, and FIGURE 8 is a partial side view of the retractable one-piece front panel as taken along the line B—B in FIGURE 6.

Referring to FIGURE 1, there is shown a cabinet for a television receiver comprising top and side closure members 1 and 2 respectively and including a retractable one-piece front panel 3 in accordance with the present invention. The retractable front panel 3 is provided with furniture-representing indicia 4 on the outer surface thereof to completely disguise the true function of the television receiver during non-use. In the embodiment of FIGURE 1, the indicia 4 serve to simulate a plurality of drawers in the Italian provincial style. Thus, the overall appearance of the television receiver during non-use is that of a commode in the Italian provincial style, the true function of the receiver being completely disguised.

Various latch mechanisms, such as magnetic latches, might advantageously be employed to maintain the retractable front panel in the proper orientation in the non-retracted position.

When a television presentation is to be viewed, the retractable front panel 3 is rotated from a position generally perpendicular to the top closure member 1 to a position generally parallel therewith as indicated by the arrow 5. The retractable front panel 3 is then slid in the direction of the arrow 6 to a position underlying and generally parallel with the top closure member 1. It should be appreciated that in some applications it might be desirable to stow the retractable one-piece front panel at a position below the television chassis rather than adjacent the top closure member. In such an application during retraction the retractable front panel would be initially rotated downwardly rather than upwardly as in the depicted embodiment.

It should also be appreciated that in some applications it might prove advantageous to stow the retractable front panel at an angle to the top closure member rather than generally parallel therewith as in the depicted embodiment.

In FIGURE 2 there is shown a view of the cabinet of FIGURE 1 with the retractable front panel 3 in the completely retracted position. In this position the display screen 7 can be viewed and the associated controls 8 manipulated.

As shown in FIGURE 2, the retractable front panel 3 does not extend from the front of the cabinet in the retracted position. Thus the bottom edge 9 of the front panel 3 in the retracted position blends into the adjacent cabinet elements so that the overall appearance is that of an uninterrupted front surface, the true nature of the retractable front panel not being discernible. The bottom edge 9 of the retractable front panel 3 might also be provided with suitable indicia or be otherwise designed as to enhance the manner in which the retractable front panel blends into the front of the cabinet in the retracted position.

Since in many television receivers the area to be disguised is higher than the cabinet depth, in accordance with one embodiment of the invention the retractable front panel 3 extends from the rear of the cabinet. The manner in which the retractable front panel 3 extends from the rear of the cabinet is more clearly shown in FIGURES 3 and 4.

In FIGURE 3 there is shown a rear perspective view of the television receiver cabinet shown in FIGURE 1, the retractable front panel 3 being in the non-retracted position. The cabinet is provided with a rear closure member 10 having an aperture 11 therein to receive the retractable front panel 3 in the retracted position. The cabinet is also provided with a rearwardly extending projection 12 which is conventionally utilized to receive the extremity of the cathode ray tube in order to minimize the depth of the cabinet.

In FIGURE 4 there is shown a rear perspective view of the television receiver cabinet as shown in FIGURE 3 wherein the retractable front panel 3 is in the retracted position, the retractable panel extending from the rear of the cabinet through the aperture 11.

Referring to FIGURE 5, there is shown a side view of the television receiver shown in FIGURES 1 through 4. FIGURE 5 illustrates more clearly how the retractable front panel is first rotated as indicated by the arrow 5 and is then slid rearwardly as indicated by the arrow 6 to underlie the top closure member 1, the retractable front panel 3 in the retracted position extending beyond the rear closure member 10 of the cabinet. It should be noted that the retractable front panel 3 extends no further beyond the rear closure member 10 than does the projection 12. Thus, since the rearwardly extending projection 9 is conventionally provided on most television receiver cabinets, the fact that the retractable front panel 3 extends beyond the rear of the cabinet raises no problems and no additional space is required for the cabinet. Further, since the retractable front panel 3 need not extend beyond the rear closure member 10 to any great distance, the extending portion of the retractable front panel 3 is not freely visible and indeed cannot be seen at all from the normal viewing position.

Thus, through the use of the one-piece retractable front panel 3 of the invention, complex door arrangements and stowage mechanisms as employed in the prior art are completely obviated. Since the furniture representing indicia 4 can be chosen to simulate any desired furniture design, the true function of the television receiver is completely disguised.

Also, complete freedom of design of the retractable front panel is enjoyed since no functional restrictions are encountered such as are present in various prior art door arrangements. Thus, continuous horizontal furniture representing indicia can be employed as for example such as are shown in FIGURE 1 to represent drawers, no interruptions of the indicia being required to satisfy functional requirements. The resultant freedom of design allows the realizing of a wide range of aesthetically pleasing cabinetry designs completely compatible with differing decor requirements.

Further, the invention provides a relatively inexpensive device since multiple panels or hinges are obviated and complex stowage mechanisms are not required. Further, an additional cost saving is realized since the inner surface of the front panel 3 adjacent the display screen is not visible and thus need not be finished.

Yet further, since the retractable front panel 3 is completely retracted when a television presentation is being viewed no interference with the presentation results. In this regard since the bottom edge 9 of the retractable front panel 3 blends into the front of the cabinet, the retractable front panel 3 is not at all discernible in the retracted position.

Also as shown, the manipulations required to stow the retractable front panel 3 are extremely simple. Thus, one hand can be employed to simple rotate the retractable front panel 3 to a position generally parallel with the top closure member 1 and then to slide the front panel 3 to a position underlying the top closure member 1, Accordingly, the complex stowage manipulations required by the prior art are completely eliminated.

Even further, the simplicity of the invention as contrasted to the complexity of the prior art considerably lessens the possibility of malfunction and breakage during repeated use. Indeed, even if the retractable front panel 3 is dropped from the position shown by the dotted line in FIGURE 1 an air cushion is formed between the display screen and the retractable front panel so that no damage results from the impact of the retractable front panel.

Referring to FIGURES 6, 7 and 8 there is shown a representative track arrangement for retracting the one-piece retractable front panel of FIGURES 1 through 5, like reference numerals being utilized for identical elements.

FIGURE 6 depicts the top closure member 1 partially broken away to reveal the underlying retractable front panel 3 in the retracted position. For simplicity only one side of the front panel and associated cabinetry is shown, the other side being identical to the depicted side. As shown most clearly in the sectional view of FIGURE 7, the side edges of the retractable front panel are provided with slots 13 which engage a suitable L-shaped track member 14, the member 14 being mounted to a suitable cross-member 15 within the cabinet.

Thus, when the retractable front panel is rotated to a position generally parallel with the top closure member 1 the panel can be slid along the tracks 14 to the retracted position. The slot 13 is so formed as to not extend along the entire edge of the front panel, a portion 16 of the front panel serving to prevent the panel from being retracted beyond the desired point.

The retractable front panel is provided with hanging members 17 as shown most clearly in FIGURES 6 and 8. The hanging members 17 engage pivot pins 18 positioned at the extremity of the tracks 14 when the retractable front panel is completely withdrawn from a position underlying the top closure member 1. When the hanging member 17 contacts the pivot pin 18 the track is disengaged from the front panel and the panel can be rotated to the position shown in FIGURE 1. The reverse operation is followed in moving the retractable front panel from the non-stowed to the stowed position.

Although the invention has been described with respect to certain specific embodiments, it will be appreciated that modifications and changes may be made by those skilled in the art without departing from the spirit and scope of the invention. In particular, the retractable one-piece front panel of the invention might be provided with any desired furniture representing indicia and any suitable track means might be employed. Further, the one-piece retractable front panel need not extend across the entire front of the cabinet as shown in the depicted embodiment but rather might cooperate with fixed portions of the front of the cabinet to achieve a desired effect. Thus, fixed grill cloth portions might be employed in conjunction with the retractable front panel of the invention.

What is claimed as new and desired to be secured by Letters Patent of the United States is:

1. A cabinet for a television receiver chassis including a display screen, said cabinet comprising;

(A) a top closure member having a front edge, (B) a back closure member having an aperture therein, (C) a retractable one-piece front panel having inner and outer surfaces and top and bottom edges, (D) said retractable front panel completely overlying said display screen in the unretracted position with said inner surface positioned adjacent said display screen, (E) said outer surface having furniture representing indicia formed thereon to disguise the actual purpose of said cabinet, and (F) means for retracting said front panel to a position within said cabinet generally parallel to and underlying said top closure member so that said top edge of said front panel extends through said aperture and said bottom edge of said front panel extends from said cabinet no further than said front edge of said top closure member.

2. The cabinet as defined in claim 1 wherein said back closure member further includes a rearwardly extending projection and said top edge of said retractable front panel extends no further than does said projection.

3. The cabinet as defined in claim 1 wherein said retractable front panel includes first and second side edges and said retracting means comprises track means mounted within the cabinet for engaging said first and second side edges.

4. The cabinet as defined in claim 1 including hanging members from which said front panel depends in the unretracted position and wherein said retracting means includes track means for engaging said front panel during retraction thereof.

References Cited

UNITED STATES PATENTS

| | | | |
|---|---|---|---|
| 124,653 | 3/1872 | Aling | 312—240 X |
| 1,327,977 | 1/1920 | Bennington | 312—8 |
| 1,414,151 | 4/1922 | Orsenigo | 274—2 |
| 1,696,683 | 12/1928 | Kieffer | 312—8 |
| 2,119,102 | 5/1938 | Flaherty | 312—7 X |
| 2,571,903 | 10/1951 | Loewi | 312—7 |
| 2,826,755 | 3/1958 | Aiken | 312—7 X |

FOREIGN PATENTS

| | | |
|---|---|---|
| 817,271 | 5/1937 | France. |
| 1,255,173 | 3/1960 | France. |

BOBBY R. GAY, *Primary Examiner.*

JAMES L. KOHNEN, *Assistant Examiner.*

U.S. Cl. X.R.

312—7, 240